United States Patent

[11] 3,561,573

| | | |
|---|---|---|
| [72] | Inventor | Laird R. Allen, Jr.<br>Monroeville, Pa. |
| [21] | Appl. No. | 782,366 |
| [22] | Filed | Dec. 9, 1968 |
| [45] | Patented | Feb. 9, 1971 |
| [73] | Assignee | Westinghouse Electric Corporation<br>Pittsburgh, Pa.<br>a corporation of Pennsylvania |

[54] SELF-ADJUSTING ELECTROHYDRAULIC BRAKE CONTROL
5 Claims, 5 Drawing Figs.

[52] U.S. Cl. .................................................. 188/171,
 60/7; 91/170; 303/3
[51] Int. Cl. ..................................................... B60t 13/04,
 B60t 13/22
[50] Field of Search....................................... 60/7;
 91/170, 180A1, A2, 178, 411, 411A; 188/170,
 171; 303/2, 3

[56] References Cited
UNITED STATES PATENTS

| 3,077,186 | 2/1963 | Beaubien et al. | 91/178 |
| 3,218,796 | 11/1965 | Fites | 60/7 |

Primary Examiner—Duane A. Reger
Attorneys—A. T. Stratton, F. P. Lyle and E. Strickland ABSTRACT: A compact electrohydraulic brake control system in which a reservoir of brake fluid is employed to compensate for brake shoe wear and for brake fluid leakage. In addition, an electric recycling circuit provides a means for compensating for fluid leakage, and a check valve arrangement prevents the hydraulic system from becoming air bound even when the fluid containing parts thereof are above the fluid level in the reservoir.

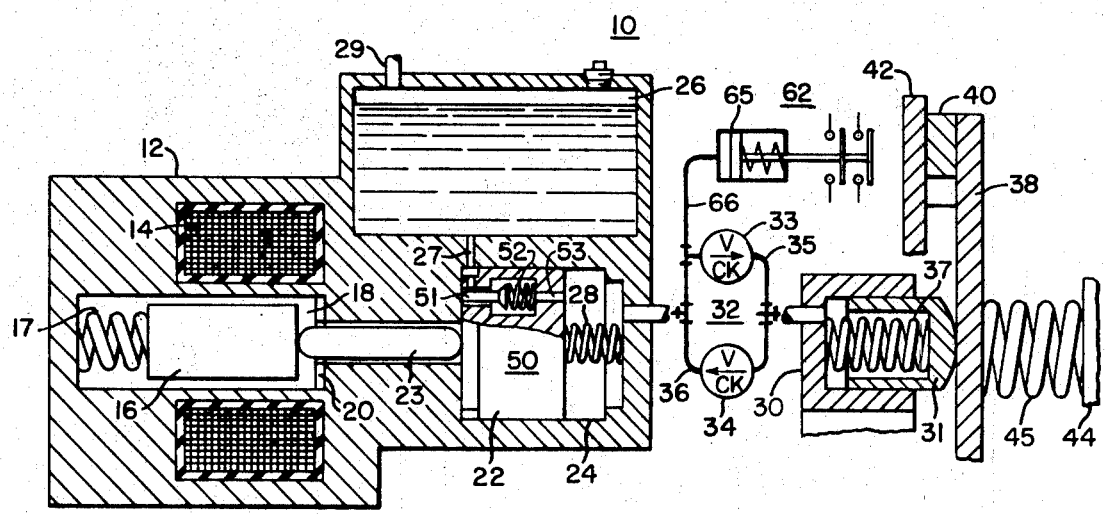

SELF-ADJUSTING ELECTROHYDRAULIC BRAKE CONTROL

BACKGROUND OF THE INVENTION

The present invention relates to an electrohydraulic brake system particularly suitable for rapid transit vehicles though not limited thereto.

In a basic fail-safe emergency brake system, a fixed load spring may be employed to mechanically force a brake shoe against a wheel disc associated with a track wheel of a transit vehicle, for example, and the wheel disc may be geared to rotate at a multiple of track wheel speed of rotation. The brake shoe is lifted off or moved away from the disc by overcoming the force of the load spring in a direction opposite the directive force of the spring. This may be accomplished by energizing a solenoid which forces an armature against a piston in a master cylinder by moving a thrust pin or rod engaging the piston. The master piston then operates on a fluid contained within a hydraulic system thereby producing a pressure on a slave piston in a slave cylinder, the slave piston transmitting the brake liftoff force to the brake shoe structure. In this manner, the brakes are released for rolling the vehicle, and the brakes may be reapplied by deenergizing the solenoid.

The brake system is fail-safe since any failure of the brake-releasing system permits the load spring to immediately force the brake shoe against the wheel disc.

The solenoid, when energized, moves the armature against an inside end wall of a magnetic housing after traveling a small distance or gap having a predetermined dimension, i.e., a dimension commensurate with the displacement required for moving the brake shoe from the wheel disc.

In the basic brake system described above, a hydraulic actuating arrangement is employed which increased the dimension of the solenoid gap with the waring away of the brake shoe or lining material. This in turn, required a relatively large solenoid structure to overcome the increased gap distance when actuating a brake with a worn shoe or shoes. For example, in meeting design specifications of an 0.05 inch liftoff or displacement of the brake shoe from the wheel disc, and a system accommodation of an 0.3 inch in brake shoe wear, the total displacement of the master piston in the above described system would have to produce an 0.35 inch shoe movement. This amount of shoe movement requires a solenoid structure too bulky for many applications.

BRIEF SUMMARY OF THE INVENTION

Broadly, the present invention permits the use of a relatively small, compact solenoid structure by employing a reservoir of brake fluid in a manner which fixes the dimension of the armature or solenoid gap regardless of the amount of wear experienced by the brake shoe. This is accomplished by venting the brake fluid displaced by the worn shoe into the reservoir through a valve disposed in the master cylinder, the valve being fully opened by the abutment of the master piston against the end wall of the master cylinder under force of the load spring when current to the brake-actuating solenoid is removed or reduced a predetermined amount. With such an arrangement the positions of the master piston and armature (and thus the gap) remain unchanged, and hence the force generated by the solenoid remains unchanged as well as that of the brake load. Furthermore, since the size of the gap remains unchanged, a given solenoid current will always produce the same force and hence the same hydraulic pressure for actuating the brake. In this manner, the brake system of the present disclosure is self-adjusting and provides compensation for internal and external leakage of the brake fluid.

The invention includes a second means for fluid leakage compensation, the means comprising a recycling circuit employing a timing relay arrangement and a pressure sensitive switch The switch senses a drop in fluid pressure by closing and thereby energizing the relay arrangement which, in turn, deenergizes momentarily the brake-actuating solenoid to allow the valve in the main cylinder to open and thus replenish the hydraulic system. Thereafter the solenoid is reenergized to move the brake shoe away from the wheel disc.

The invention further includes a check valve arrangement located below the reservoir level. The arrangement maintains a predetermined minimum pressure in a slave cylinder should a leak occur in conduits or components located above the level of the reservoir.

THE DRAWINGS

The invention, along with its advantages and objectives, will be more apparent from the following detailed description taken in connection with the accompanying drawings in which:

FIG. 1 is a diagrammatic view of a electrohydraulic brake control system constructed in accordance with the principles of the present invention;

FIG. 2 is a partial section of a solenoid gap structure for use in the system of FIG. 1;

FIG. 5 is a schematic diagram of a recycling circuit constructed in accordance with the principles of the invention.

PREFERRED EMBODIMENT

Figure 3:
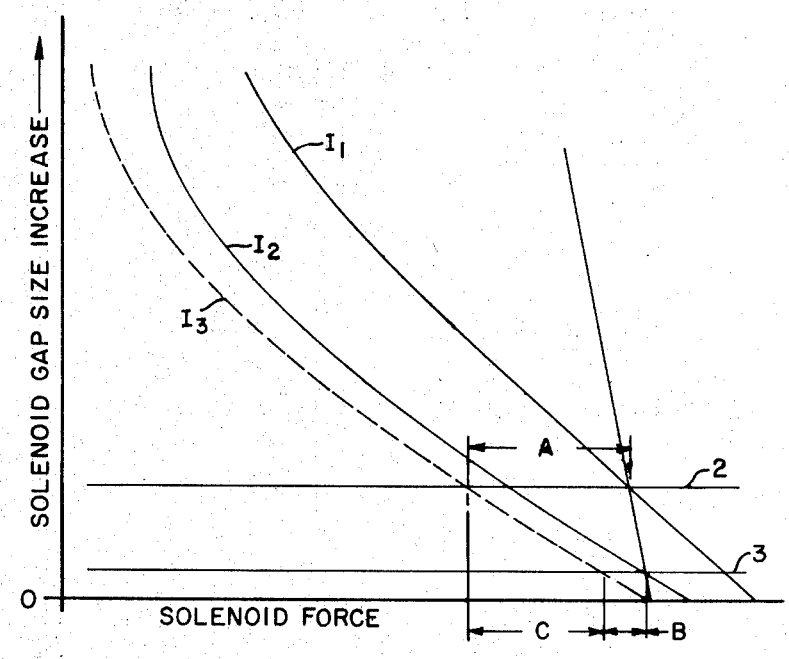
FIG. 3 is a graph showing solenoid energizing current relationships in a prior brake control system.

FIG. 1 shows diagrammatically the brake control system of the present invention, the system being labeled generally by numeral 10. The system includes a housing 12 made of a ferrous metal, a solenoid 14, and an armature 16 engaged by a follower spring 17 disposed between one end of the armature and an end wall of the housing. The other end of armature and housing forms an armature gap 18 through which the armature is adapted to move when the solenoid is energized. In the gap is disposed a nonferrous shim or spacer 20.

The armature 16 is mechanically connected to a main or master piston 22 by a nonferrous push pin 23 disposed between the armature and the piston. The piston is disposed in a master cylinder 24, said cylinder being shown as a part of the housing 12 and connected in fluid communication with a reservoir 26 of brake fluid through an opening 27 provided in the housing or cylinder or by other suitable means. The master piston is biased by a return spring 28, and the reservoir is vented to atmosphere by a vent means 29.

The master cylinder 24 is hydraulically connected to a slave cylinder 30 and an associated piston 31 through a novel pressure control arrangement 32 adapted to maintain a minimum back pressure in the slave cylinder in a manner explained hereinafter. The system, diagrammatically shown in FIG. 1, comprises at least two valves 33 and 34 respectively connected in branch conduits 35 and 36 connected between the master and slave cylinders. The valves are of the unidirectional fluid flow type, and are further connected in the conduits to permit flow in respectively opposite directions, as indicated by appropriate arrows, and in a manner to be more particularly explained hereinafter.

The slave piston 31 is biased by a takeup spring 37, and disposed to engage and actuate a brake shoe support structure 38, having a brake shoe 40 suitably fixed thereto and disposed to engage a braking disc 42. The disc may be associated with a track wheel (not shown) of a transit vehicle, and may be geared to said wheel to rotate at a multiple speed thereof in effort to dissipate greater amounts of energy in the form of heat when the brake is applied, and to multiply the braking torque on the track wheel.

Between the brake shoe support 38 and a fixed support 44 on an associated transit vehicle (not shown) is fixed a relatively heavy load spring 45 for forcing the brake shoe 40 against the disc 42 when the solenoid 14 is deenergized. In FIG. 1, the brake control system is shown deenergized.

A valve structure 50 is provided in the master piston 22 for controlling the amount of brake fluid in the hydraulic system of the invention, the hydraulic system comprising the master and slave components and the pressure control arrangement 32 connecting the master and slave cylinders 24 and 30 together. In the embodiment of FIG. 1, the valve has a stem portion 51 disposed to engage one end of the master cylinder 24, and a closing spring 52 disposed to seat the valve when the piston 22 moves away from the one end of the cylinder 24.

The master piston 22 is further shown with an opening 53 for providing fluid communication between the valve 50 and the portion of the cylinder 24 to right of the master piston.

In operation of the system 10, as shown in FIG. 1, the load spring 45 forces the brake shoe 40 against the disc 42 when the solenoid 14 is deenergized as explained above. The master piston is held at its left travel limit by the return spring 28, and the valve 50 is held open by engagement of its extension 51 with the left end wall of the master cylinder 24. The reservoir of brake fluid 26 is thereby connected to the remainder of the hydraulic system to supply the same with fluid.

When the solenoid is energized by a suitable source of electrical energy (not shown), the armature 16 forces the push pin 23 to the right, thereby forcing the master piston 22 to the right against the force of the return spring 28. After a predetermined minimum distance of piston travel to the right, the valve 50 closes by action of its closing spring 52. Fluid is now trapped between the master piston 22 and the slave piston 31, and further movement of the master piston to the right develops a hydraulic pressure which tends to move the slave piston against the opposing force of the load spring 45. In this manner, the brake shoe 40 is lifted off or moved away from the disc 42 thereby releasing the brakes for vehicle travel.

When current to the solenoid 14 is removed or reduced a predetermined amount, the force of the load spring 45 forces the pistons 31 and 22 to the left, and after a predetermined distance, the valve 50 opens. If the brake shoe 40 is worn, the slave piston 31 forces the fluid in the hydraulic system back into the reservoir 26 through the open valve 50. Thus, as the brake shoe 40 wears, the amount of fluid capable of being trapped between the master and slave pistons is reduced while the amount of liftoff or movement of the brake shoe and support 38 for a given armature and piston movement remains the same. Thus, the solenoid gap 18 and the force required to close the gap remain substantially unchanged. Similarly, the brake load, i.e., the force at which the shoe 40 is applied against the disc 42, is virtually unaffected by brake shoe wear.

Further, since the solenoid gap 18 is always the same, when the valve 50 closes and traps the fluid, a given solenoid current will always produce the same solenoid force, and hence the same hydraulic pressure for actuating the brakes.

In the type of solenoid-armature structure shown and described above, the force generated by the solenoid 14 increases at a rate inversely proportional to the square of the gap 18 as the gap becomes smaller, i.e., as the armature moves to the right in the embodiment depicted in FIG. 1. In order to limit this force at the gap closing position, the nonferrous shim 20 is employed in the gap, the shim thus determining the minimum gap setting for the solenoid.

To produce a specified liftoff distance for the brake shoe 40, the master piston 22 must move a distance beyond the location at which the valve 50 closes (at which time the fluid is trapped) sufficient to displace an amount of brake fluid capable of moving the slave piston 31 and the brake structure 38, plus a slight additional distance to compensate for fluid compression and compliance of flexible hoses and if used a pressure switch to be described hereinafter. For example, with the present invention, the above-mentioned specified maximum brake shoe liftoff of 0.05 of an inch and a brake shoe wear accommodation of 0.3 of an inch, the total displacement of the master piston 22 would remain slightly more than that required to produce 0.05 of an inch brake shoe liftoff since brake wear is compensated for by the reservoir 26 which receives the brake fluid displaced thereby.

As explained earlier, in a system in which the solenoid gap increases with brake shoe wear, the master piston would be required to produce a brake shoe movement of 0.05 inch plus 0.3 inch or a total of 0.35 inch. In this manner and for this reason, the solenoid structure of the present invention can be substantially reduced in size, and the system 10 is made self-adjusting.

The solenoid structure of the invention may be further reduced in size in view of the following analysis. The relative areas and the distances of travel (i.e., strokes) of the master and slave pistons 22 and 31 are related as should be evident from the disclosure as thus far presented. For example, an increase in the size of the master piston would require a smaller stroke dimension for the slave piston with the size of the slave piston remaining unchanged. Thus, if the compliances of flexible hoses, if any, and the above-mentioned pressure switch are neglected, the relation of the piston areas and strokes is $$\frac{A_m}{\epsilon A_s} = \frac{X_s}{X_m}$$

where:

$A_m$ is the effective area of the master piston 22;
$A_s$ is the sum of the effective areas of the slave pistons 31 where more than one slave piston is employed;
$X_s$ is the stroke distance of a single slave piston;
$X_m$ is the stroke distance of the master piston which is in turn equal to the dimension of the solenoid gap 18.

Ordinarily, $X_s$, $A_s$ and the stiffness of the load spring 45, are parameters which are fixed by design considerations for a particular application. Since $X_s$ and $A_s$ are fixed, i.e., constant, the above equation can be written $$X_m = K \frac{A_s}{A_m}$$

In the hydraulic system of the brake control 10, as thus far described, the value of the brake fluid pressure P is dependent on $A_s$ and the stiffness of the load spring 45 as well as the force of the preload placed on the spring when it is installed. Therefore, the force F produced by the solenoid 14 in overcoming the force of the load spring is given by $F = P \times A_m$.

As evidenced by the above equations, the solenoid force decreases and the dimension of the solenoid stroke (gap 18) increases as $A_m$ is decreased. Thus, if a free choice of $A_m$ is possible, a less bulky and lighter weight electromagnetic structure comprising the solenoid 14 is possible.

In FIG. 2, such a reduction in the size of the solenoid 14 is effected by using an armature with a tapered end portion 16' in a correspondingly tapered housing portion 12', the tapered portions forming an inclined or angled gap 18'. The closed limit of the gap is fixed by a nonferrous shim 20' disposed between the small end of the armature and the corresponding end of the tapered housing portion. The tapered portions may have an included angle of 60°, for example, though the invention is not limited thereto. About the armature is disposed a solenoid 14', and a nonferrous push pin 23' is disposed to engage the tapered end of the armature as shown.

When the solenoid 14' is energized, the armature moves axially through the inclined gap 18' until the small end of the armature engages the shim 20', as shown in FIG. 2.

To release and reapply the brakes in a system using a solenoid gap which changes with brake gear, a considerable spread or differential in solenoid energizing current is required to release and reapply the brakes for both worn and new linings. This is illustrated in the graph of FIG. 3 in which a varying gap dimension is plotted against solenoid force. The straight line 1 at the top of the graph expresses the fixed linear relation existing between the force of a load spring and a varying solenoid gap in the basic system described above. The two vertical lines 2 and 3 represent the solenoid gap at brake liftoff for a worn and a new lining respectively, the minimum gap position being at the ordinate of the graph, and the armature stroke being measured therefrom. The three curved lines $I_1$, $I_2$ and $I_3$ represent the relationship between solenoid force and gap size for three different values of solenoid current in a manner presently to be explained.

Assume as an initial condition that the solenoid gap is of size indicated by line 2. Then curve $l_1$ represents the gap force curve produced by application of a current to the solenoid just large enough to release the brakes, i.e., to lift the shoe or lining away from the brake disc. In moving along line $l_1$ towards a minimum gap position (on the ordinate of the graph), the solenoid force increases in magnitude over that of the load spring thereby rapidly translating the brake until the armature reaches its minimum gap position. The application of a lesser value of current, i.e., a value which will produce curve $I_2$, for example, has the same effect if the brake lining is new.

Once the brakes are released by the application of solenoid current, the brakes can be reapplied by reducing the current to produce a curve as described by line $I_3$ which reduces the solenoid force and the force of the hydraulic system acting against the force of the load spring. The load spring thus functions to bring the lining in contact with the disc.

The force at which the worn lining is pressed against the disc (i.e. the brake load) with solenoid current such as to produce curve $I_3$ is represented by dimension A in FIG. 3. With no current to the solenoid, the brake force or load is, of course, maximum, and with the brake fully released, the force or load is zero. The same curve $I_3$ and a new lining would produce a brake load represented by dimension B in FIG. 2. Thus, the differential in brake load or force for new and worn linings, as indicated by dimension C, is considerable for the prior, gap changing, brake control system.

Figure 4:
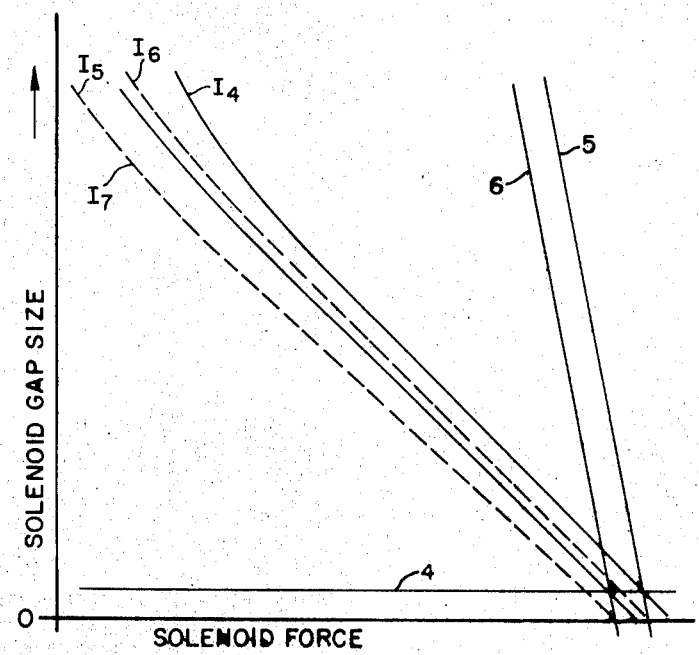
FIG. 4 is a graph showing solenoid energizing current relationships in the system of FIG. 1.

FIG. 4 is a graph similar to that of FIG. 3, FIG. 4 showing the improvement obtained with the system 10 of the present invention.

In FIG. 4, only one vertical line 4 is needed to represent the dimension of the solenoid gap 18 since the gap 18 is the same for both worn and new linings. Thus, the load spring forces for worn and new linings are represented respectively by straight lines 5 and 6, the spring force for the new lining being greater. The solid curved lines $I_4$ and $I_5$ represent the curves produced by the currents required to overcome the force of the load spring 45 with new and worn linings respectively. Similarly, the dash-curved lines $I_6$ and $I_7$ represent, respectively, the curves produced by the current values required to reapply the brakes for new and worn linings in the system 10.

As seen from FIG. 4 the difference in solenoid current required for releasing and reapplying the brakes for both worn and new linings is considerably smaller than that shown in FIG. 3. This is an important advantage in designing a brake control system for modulating the force at which the brakes are applied and thereby effecting a precise control of the brakes. In the operation of the prior system, represented by FIG. 3, precise control and modulating of the brake load is practically impossible with a brake control means having an off and two or three intermediate fixed current values for solenoid operation.

Another advantage of the invention is that each time the electrohydraulic system is deenergized, the valve 50 in the master cylinder 24 opens to replenish the hydraulic from the system has occurred. In this manner, fluid leakage compensation is insured until the reservoir is emptied.

When the master piston 22 moves to the left, a small negative pressure may occur in the hydraulic system which would ordinarily cause the slave piston 31 to move leftward and thus away from the brake support 38. To prevent this from happening during negative pressure transients, the takeup spring 37 functions to maintain the slave piston in its position against the brake support 38.

Because of space limitations or other reasons, some of the conduits and components in the hydraulic system may be located above the level of the reservoir 26 and thus subject to a subatmospheric pressure value when the solenoid 14 is deenergized. For example, if the branch conduit 35 (without the valve 33) was located above the reservoir, and the conduit developed a leak to the outside atmosphere, the leftward movement of the master piston 22 would reduce the pressure in the conduit, the reduced pressure causing air to be drawn into the system and thus rendering it airbound and inoperative.

To prevent this from happening, the pressure control arrangement 32 (FIG. 1) is employed to maintain a minimum pressure in the slave cylinder 30 to insure its brake actuating capabilities. As explained above, the system comprises two branch conduits 35 and 36, having respective unidirectional flow valves 33 and 34, connecting the master cylinder 24 to the slave cylinder. The valves are connected in a manner to allow fluid flow in one and respectively opposite directions through the conduits, the fluid entering the slave cylinder flowing only through the valve 33, for example, while the fluid leaving the slave cylinder flows only through the valve 34.

When the solenoid 14 is energized, fluid flows through the branch conduit 35 and the valve 33, in the example given above and in FIG. 1, against the pressure of a small spring (not shown) in the valve, for example, a spring pressure equivalent to a 1 to 2 p.s.i. valve pressure differential. In this manner, the brake fluid and pressure is easily delivered to the slave piston 31 for releasing the brake.

When the solenoid 14 is deenergized, the valve 33 blocks the flow of fluid therethrough so that the fluid is now directed through the valve 34 which is connected to provide a return path for the fluid to the master cylinder 24. The pressure differential value of the valve 34 is chosen to prevent the pressure on the slave cylinder side of the arrangement from falling below a minimum value to insure slave piston actuation. This pressure valve is sufficient to overcome the aforementioned negative pressure transients and preferably at least equal to the heat of the highest point of the system above the reservoir 26.

The system, structure and operation, as thus far described, has been directed to a fail-safe brake arrangement for one side of one brake disc 42 associated with one wheel of a vehicle not shown.

A similar system may be provided for each of the wheels of the vehicle or for each axle, and the system, shown schematically in FIG. 1, may be equipped to apply a brake shoe against the other side of the disc 42 so that brakes are effectively and simultaneously applied to both sides of the disc.

The above-described fluid leak compensation provided by the reservoir 26 and the valve 50 would allow for an amount of fluid leakage smaller than that which would cause the brakes to be applied between times when the brakes are ordinarily and purposely applied. For example, the brakes may be applied (i.e., the solenoid 14 deenergized) at each station along the route of a transit vehicle. At each of these occurrences, the master piston 22 moves to the left to open the valve 50 to replenish the hydraulic system (if needed) as explained earlier. If however, the rate of fluid leakage is such that the brakes are applied between the stations, locked wheels between stations would be the result. Locked wheels are not easily sensed by an operator of a multicar train, for example. A remedy for this type of trouble would involve the use of a pressure switch connected to operate an indicating lamp when the hydraulic pressure fails below that required to produce maximum vehicle deceleration without locking the wheels. The operator cold then momentarily deenergize the solenoid (to allow refilling of the hydraulic system) and then release the brakes by applying full current to the solenoid. Thus, with a low pressure indicating signal, the operator could effect manually a recycling operation to effect release of the vehicle brakes.

This recycling process is made automatic by the circuit shown in FIG. 5, and generally designated by numeral 60, said circuit constituting a second means for effecting brake fluid leakage compensation in the present disclosure.

The circuit 60 includes a pressure sensitive switch 62 having at least two sets of contacts 63 and 64 and a pressure sensing chamber 65 connected to the hydraulic system by a conduit 66 as shown in FIG. 1. Other types of pressure switches may be employed, the one in FIG. 5 being shown only for purposes of illustration.

A brake control means 68 is commonly connected to one side of the contacts 63 and 64 and between said one side and one side 69 of a suitable source of supply current not shown. The other side of the contacts 63 is shown connected to the other side 70 of the supply source through an indicating lamp 71. The other side of the contacts 64 is connected to a solenoid 74 and normally open contacts 75 of a first time delay relay 76. The solenoid 74 is serially connected between the contacts 64 and the side 70 of the power supply. The contacts 75 are further serially connected to the side 70 of the power supply through a solenoid 78 of a second time delay relay 79, said relay having normally closed contacts 80 serially connected between the brake control means 68 and the side 70 of the power supply through the brake control solenoid 14.

In operation of the circuit 60, the brake control means 68 functions to control the amount of current flow through the brake solenoid 14, said control generally being operated by an operator of the associated vehicle; current flow is through the serially connected and normally closed contacts 80 of the relay 79.

When the pressure falls below a predetermined amount in the hydraulic system (FIG. 1), the pressure switch 62 operates to close its contact 63 and 64, said contacts thereby completing circuits to the lamp 71 and to the first relay solenoid 74 respectively. The solenoid 74 is energized thereby, and thus operates to close its contacts 75 after a time delay preset to be longer than that required to develop a brake actuating pressure in the hydraulic system when the brake solenoid 14 is energized by operation of the brake control 68.

When the relay contacts 75 close, they complete a circuit through the second relay solenoid 78 which is thereby energized to immediately open its normally closed contacts 80. When the contacts 80 open, the circuit between the brake control 68 and the brake solenoid 14 is opened thereby deenergizing said solenoid and the hydraulic system. The master piston 22 is thus, momentarily, allowed to return to its left position which opens the valve 50 to replenish the hydraulic system.

The second time delay relay 79 is set to reclose its contacts 80 after a period of time sufficient to allow the momentary return of the master piston, the reclosed contacts effecting the reenergization of the brake solenoid 14 and the release of the vehicle brakes.

With the increase in hydraulic pressure allowed by the deenergization of the brake solenoid 14, the pressure switch 62 is opened thereby deenergizing the first relay 76 and opening its contacts 75. The circuit 60 is now ready for another recycle operation.

Thus, if the hydraulic pressure again falls below that value for the actuation of the pressure switch 62, the above cycle of operation is repeated, the lamp 71 being energized and deenergized to emphasize the brake situation.

From the foregoing description it should now be apparent that new and useful electrohydraulic brake system has been disclosed, and that the system is constructed in an unobvious manner to provide a self-adjusting, leak-compensating brake system and a compact brake control solenoid structure. This is accomplished by use of a solenoid gap 18 that remains the same regardless of brake shoe wear, and a reservoir 26 with a valve 50 connected to replenish a hydraulic system, and to receive brake fluid from said system. The disclosure includes further an arrangement 32 which prevents the system from becoming airbound even when the components are disposed above the reservoir, and a second leak-compensating means in the form of the recycling circuit 60.

Though the invention is described with a certain degree of particularity, changes may be made therein without departing from the spirit and scope thereof.

I claim:
1. An electrohydraulic brake arrangement comprising:
   a housing structure;
   a master cylinder and a slave cylinder each having a piston disposed in respective sliding engagement in said cylinders, said cylinders being connected together in fluid communication to form a hydraulic actuating system;
   a reservoir of brake fluid connected in fluid communication with said hydraulic actuating system;
   a control valve operatively associated with said master cylinder for controlling the flow of brake fluid between said hydraulic actuating system and said reservoir;
   a brake-actuating solenoid and armature disposed in said housing structure, said armature being mechanically connected to operate the master piston;
   a brake structure including a brake shoe disposed to engage a braking surface associated with a vehicle wheel;
   a load spring disposed to engage said brake structure and to force said shoe in the direction of said surface; and
   the slave piston being disposed to engage said brake structure, and to force said brake shoe from said surface against the force of said load spring when said solenoid is energized.

2. The arrangement described in claim 1 in which the slave cylinder is provided with a takeup spring to maintain the engagement of the slave piston with the brake structure during negative pressure transients in the hydraulic actuating system.

3. The arrangement described in claim 1 in which the control valve is located in the master piston with an operating means disposed to engage an end wall of the master cylinder, said valve being in a fully open position when the master piston engages said end wall.

4. The arrangement of claim 1 in which the master and slave cylinders are connected together by conduit means having at least two branches, and an unidirectional valve means connected respectively in each branch, said valves further being connected to allow fluid flow in said branches in one and respectively opposite directions, said valves being further operative to maintain a minimum pressure in the slave cylinder.

5. The arrangement described in claim 1 in which the armature has a tapered end portion, and the housing structure has a tapered end portion adjacent thereto, said tapered end portions forming an inclined gap through which the armature moves when the solenoid is energized.